(12) United States Patent
Ozaki et al.

(10) Patent No.: US 12,077,032 B2
(45) Date of Patent: Sep. 3, 2024

(54) PASSAGE OPENING AND CLOSING DEVICE

(71) Applicant: DENSO CORPORATION, Kariya (JP)

(72) Inventors: Sei Ozaki, Kariya (JP); Yoshihiro Suzuki, Kariya (JP); Fumitaka Yoshizumi, Nagakute (JP); Takayuki Aoyama, Nagakute (JP)

(73) Assignee: DENSO CORPORATION, Aichi-pref. (JP)

( * ) Notice: Subject to any disclaimer, the term of this patent is extended or adjusted under 35 U.S.C. 154(b) by 219 days.

(21) Appl. No.: 17/700,822

(22) Filed: Mar. 22, 2022

(65) Prior Publication Data
US 2022/0212519 A1 Jul. 7, 2022

Related U.S. Application Data

(63) Continuation of application No. PCT/JP2020/034497, filed on Sep. 11, 2020.

(30) Foreign Application Priority Data

Oct. 3, 2019 (JP) ................................. 2019-183215

(51) Int. Cl.
*B60H 1/00* (2006.01)
*B60H 1/12* (2006.01)

(52) U.S. Cl.
CPC ..... *B60H 1/00692* (2013.01); *B60H 1/00514* (2013.01); *B60H 1/00664* (2013.01);
(Continued)

(58) Field of Classification Search
CPC .. B60H 1/00692; B60H 1/00664; B60H 1/12; B60H 2001/00092; B60H 2001/006;
(Continued)

(56) References Cited

U.S. PATENT DOCUMENTS 6,224,480 B1 * 5/2001 Le ...................... B60H 1/00692
454/160
6,293,339 B1 * 9/2001 Uemura ............. B60H 1/00064
454/126
(Continued)

FOREIGN PATENT DOCUMENTS

| JP | S60157913 A | 8/1985 |
| JP | 2004114899 A | 4/2004 |
| JP | 2018076051 A | 5/2018 |

OTHER PUBLICATIONS

Inada et al., "A Study on Leakage-Flow-Induced Vibrations", Transactions of the Japan Society of Mechanical Engineers. C, vol. 53, No. 488, 1987, pp.

*Primary Examiner* — William M McCalister
(74) *Attorney, Agent, or Firm* — Harness, Dickey & Pierce, P.L.C.

(57) ABSTRACT

The passage opening and closing device includes a casing in which an opening edge forms an opening of an air passage, and a sliding door slidably movable inside the casing to open and close the opening. A door end part of the sliding door faces a door facing wall of the opening edge when the sliding door is positioned at a closed position where the sliding door closes the opening. A gap flow-path extending in the door moving direction is formed between the door facing wall and the door end part. A distance between the door end part and the door facing wall decreases downstream in air flow in the gap flow-path so that the gap flow-path is a convergent flow path.

8 Claims, 11 Drawing Sheets

(52) U.S. Cl.
CPC ..... *B60H 1/12* (2013.01); *B60H 2001/00092* (2013.01); *B60H 2001/006* (2013.01); *B60H 2001/00714* (2013.01)

(58) Field of Classification Search
CPC ........... B60H 2001/00714; B60H 2001/00514; F16K 3/0209; F16K 3/0218; F16K 3/12; F16K 3/14
USPC .................. 454/121, 126, 156, 160; 251/333
See application file for complete search history.

(56) References Cited

U.S. PATENT DOCUMENTS

| | | | |
|---|---|---|---|
| 6,296,562 B1* | 10/2001 | Uemura | B60H 1/00692 454/159 |
| 6,347,988 B1* | 2/2002 | Kurokawa | B60H 1/00692 454/324 |
| 6,450,246 B1* | 9/2002 | Kurokawa | B60H 1/00692 165/42 |
| 6,568,468 B1* | 5/2003 | Uemura | B60H 1/00692 454/126 |
| 6,609,563 B1* | 8/2003 | Tsurushima | B60H 1/00692 165/72 |
| 9,381,788 B2* | 7/2016 | Han | B60H 1/00692 |
| 2002/0197951 A1* | 12/2002 | Uemura | B60H 1/0005 454/121 |
| 2003/0013404 A1* | 1/2003 | Uemura | B60H 1/00692 454/121 |
| 2003/0171091 A1* | 9/2003 | Uemura | B60H 1/00692 454/156 |
| 2005/0142999 A1* | 6/2005 | Uemura | B60H 1/00692 454/152 |
| 2012/0180393 A1* | 7/2012 | Suzuki | B60H 1/00692 49/348 |
| 2015/0038067 A1* | 2/2015 | Byon | B60H 1/00207 454/261 |
| 2016/0001630 A1* | 1/2016 | Nakao | B60H 1/00692 236/13 |
| 2016/0263963 A1* | 9/2016 | Sato | F24F 13/12 |

* cited by examiner

PASSAGE OPENING AND CLOSING DEVICE

CROSS REFERENCE TO RELATED APPLICATIONS

The present application is a continuation application of International Patent Application No. PCT/JP2020/034497 filed on Sep. 11, 2020, which designated the U.S. and claims the benefit of priority from Japanese Patent Application No. 2019-183215 filed on Oct. 3, 2019. The entire disclosures of all of the above applications are incorporated herein by reference.

TECHNICAL FIELD

The present disclosure relates to a passage opening and closing device for opening and closing an air passage.

BACKGROUND

A passage opening and closing device includes a sliding door and a damping mechanism provided on the back surface of the sliding door for damping a self-excited vibration of the sliding door.

SUMMARY

According to an aspect of the present disclosure, a passage opening and closing device includes a casing in which an opening edge defining an opening of the air passage is provided, and a sliding door slidably movable inside the casing to open and close the opening. The sliding door includes a door end part that forms an end part of the sliding door facing in a door moving direction of the sliding door. The door end part faces the opening edge when the sliding door is positioned at a closed position where the sliding door closes the opening. The opening edge includes a door facing wall that faces the door end part when the sliding door is located at the closed position. The door facing wall defines a gap flow-path extending in the door moving direction between the door facing wall and the door end part. A distance between the door end part and the door facing wall decreases downstream in air flow so that the gap flow-path is a convergent flow path.

BRIEF DESCRIPTION OF DRAWINGS

The details of one or more embodiments are set forth in the accompanying drawings and the description below. Other features and advantages will be apparent from the description and drawings, and from the claims.

DETAILED DESCRIPTION

Figure 1:
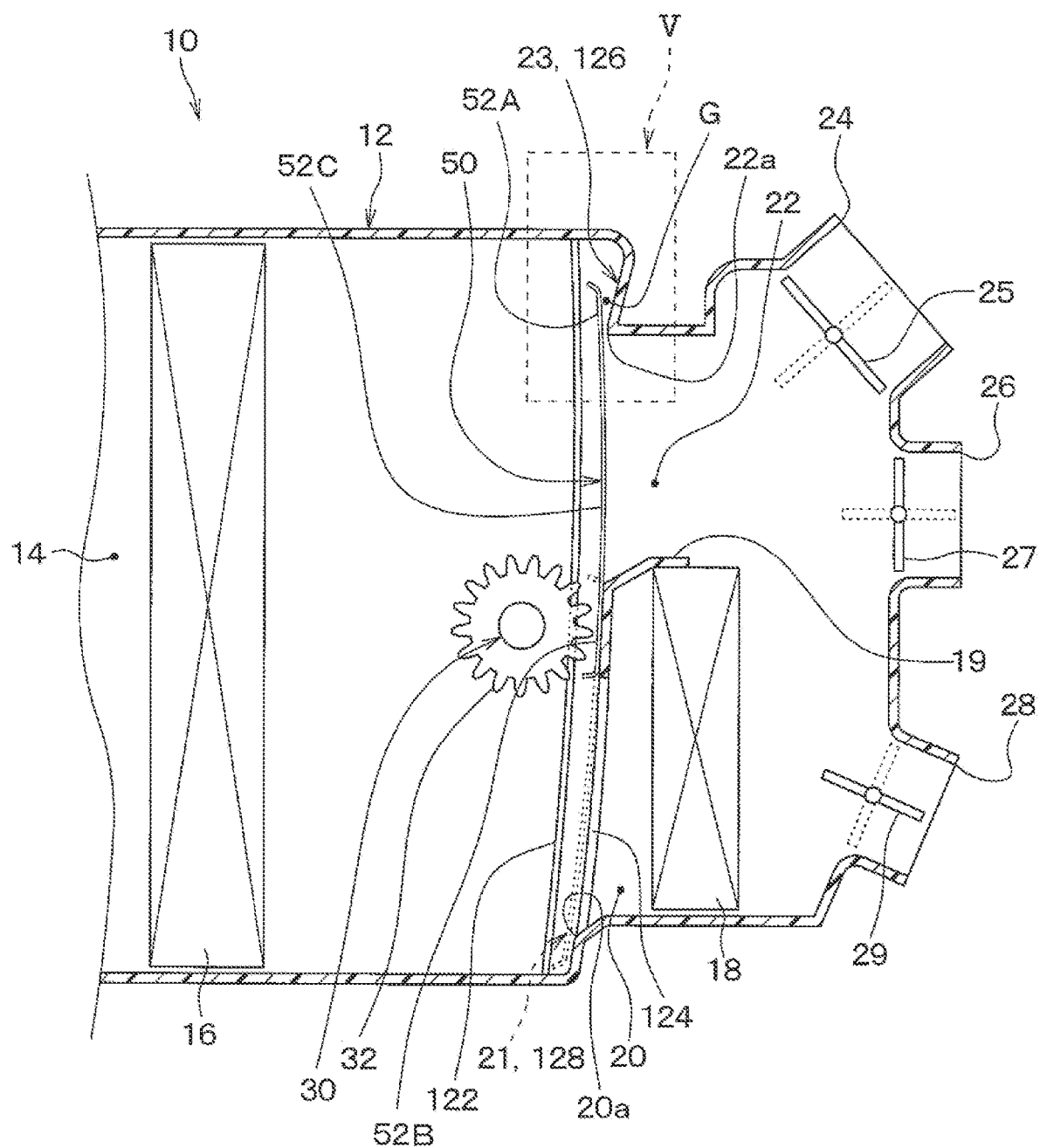
FIG. 1 is a schematic diagram illustrating an interior air-conditioning unit according to a first embodiment.

To begin with, examples of relevant techniques will be described. A passage opening and closing device of a comparative example includes a sliding door and a damping mechanism provided on the back surface of the sliding door for damping a self-excited vibration of the sliding door.

In the comparative example, it is necessary to form a spring structure for the sliding door, or to attach a bristle material or packing to the sliding door, and those may deteriorate manufacturability of the sliding door. These facts were found through intensive studies by the present inventors.

In contrast, a passage opening and closing device of the present disclosure is capable of suppressing self-excited vibration of a sliding door while reducing deterioration of manufacturability of the sliding door.

According to an aspect of the present disclosure, a passage opening and closing device includes a casing in which an opening edge defining an opening of the air passage is provided, and a sliding door slidably movable inside the casing to open and close the opening. The sliding door includes a door end part that forms an end part of the sliding door facing in a door moving direction of the sliding door. The door end part faces the opening edge when the sliding door is positioned at a closed position where the sliding door closes the opening. The opening edge includes a door facing wall that faces the door end part when the sliding door is located at the closed position. The door facing wall defines a gap flow-path extending in the door moving direction between the door facing wall and the door end part. A distance between the door end part and the door facing wall decreases downstream in air flow so that the gap flow-path is a convergent flow path.

Since the distance between the door end part of the sliding door and the door facing wall of the opening edge in the casing decreases downstream in the air flow, an unsteady flow force acts on the sliding door in a direction of attenuating vibration of the sliding door. Therefore, self-excited vibration of the sliding door can be suppressed. In addition, in the passage opening and closing device of the present disclosure, it is unnecessary to form a spring structure and attach a bristle material or packing to the sliding door. Therefore, the self-excited vibration of the sliding door can be suppressed while deterioration in manufacturability of the sliding door is reduced.

Hereinafter, embodiments of the present disclosure will be described with reference to the drawings. In the following embodiments, portions that are the same as or equivalent to those described in the preceding embodiments are denoted by the same reference numerals, and a description of the same or equivalent portions may be omitted. In addition, when only a part of the components is described in the embodiment, the components described in the preceding embodiment can be applied to other parts of the components. The following embodiments may be partially combined with each other even if such a combination is not explicitly described as long as there is no disadvantage with respect to such a combination.

First Embodiment

A present embodiment will be described with reference to FIGS. 1 to 13. In the present embodiment, an example in which a passage opening and closing device of the present disclosure is applied to an interior air-conditioning unit 10 in a vehicle air conditioner will be described.

The interior air-conditioning unit 10 shown in FIG. 1 is arranged at a substantially central portion in a vehicle width direction inside an instrument panel located at a front portion in a vehicle compartment. The interior air-conditioning unit 10 has a casing 12 that forms an outer shell thereof and defines an air passage for air that is blown toward an interior of the vehicle compartment. The casing 12 is formed of a resin (for example, polypropylene) having a certain degree of elasticity and excellent strength.

A most upstream part of the air passage in the casing 12 forms an air inflow space 14 into which the air blown from a blower unit (not shown) flows. Although not shown, the blower unit is offset from the interior air-conditioning unit 10 in the vehicle width direction, for example, toward a passenger seat. The blower unit includes an inside/outside air switching box that switches air to be taken therein between air inside the vehicle compartment or air outside the vehicle compartment, and a blower that blows the air taken into the inside/outside air switching box.

The casing 12 houses an evaporator 16 that is arranged downstream of the air inflow space 14 in air flow. The evaporator 16 is one of devices constituting a steam-compression refrigeration cycle (not shown). The evaporator 16 is a cooling heat exchanger that cools air introduced into the air inflow space 14 by an endothermic action exerted via evaporation of low-pressure refrigerant in the refrigeration cycle.

Further, the casing 12 houses a heater core 18 that is arranged downstream of the evaporator 16 in air flow. The heater core 18 is a heating heat exchanger into which high-temperature cooling water circulating in a cooling circuit of an engine (not shown) flows, and heats cool air that has passed through the evaporator 16 via heat exchange between the cool air and the cooling water.

The casing 12 defines therein a warm air passage 20 and a cool air passage 22 which are partitioned by a partition plate 19 and arranged in parallel downstream of the evaporator 16 in air flow. The warm air passage 20 is an air passage for the cool air flowing to the heater core 18, and the cool air passage 22 is an air passage for the cool air bypassing the heater core 18. The warm air passage 20 and the cool air passage 22 are air passages through which air passes.

The casing 12 includes therein a warm air opening 20a serving as an air inlet of the warm air passage 20 and a cool air opening 22a serving as an air inlet of the cool air passage 22. The warm air opening 20a is an opening defined by a warm-air opening edge 21 that is provided inside the casing 12. The cool air opening 22a is an opening defined by a cool-air opening edge 23 that is provided inside the casing 12. The warm air opening 20a and the cool air opening 22a are openings of the air passages.

The casing 12 houses an air mixing door 50 arranged between the evaporator 16 and the heater core 18. The air mixing door 50 adjusts a flow rate ratio between the cool air flowing into the warm air passage 20 and the cool air flowing into the cool air passage 22.

The air mixing door 50 constitutes a sliding door that opens and closes the air passages in the passage opening and closing device. That is, the air mixing door 50 of the sliding door is slidable inside the casing 12 to open and close the warm air opening 20a and the cool air opening 22a. The sliding door is not a film door that moves by being wound around a drive shaft 30 to perform the opening and closing movements, but a door that reciprocates while maintaining its predetermined form to perform the opening and closing movements. The sliding door differs from the film door also in that the sliding door does not have a hole for air passing therethrough.

In the interior air-conditioning unit 10, a degree of opening of the warm air passage 20 increases by the air mixing door 50 moving upward in the drawings as shown by the solid line in the drawings. In other words, when the air mixing door 50 is displaced toward a position indicated by the solid line in the drawings, an opening area of the warm air opening 20a increases.

On the other hand, in the interior air-conditioning unit 10, a degree of opening of the cool air passage 22 increases by the air mixing door 50 moving downward in the drawings as shown by the broken line in the drawings. In other words, when the air mixing door 50 is displaced toward a position indicated by the broken line in the drawings, an opening area of the cool air opening 22a increases.

In the interior air-conditioning unit 10, the flow rate ratio between the cool air flowing into the heater core 18 and the cool air bypassing the heater core 18 is adjusted by adjustment in position of the air mixing door 50. As a result, temperature of the air blown into the vehicle compartment is adjusted.

The air mixing door 50 is slidably movable inside the casing 12 by rotational force of a pinion 32 coupled to the drive shaft 30. The details of the door structure of the air mixing door 50 will be described later.

A most downstream part of the air passage in the casing 12 forms multiple openings for air, which has been conditioned in temperature inside the casing 12, being blown into the vehicle compartment. Specifically, the casing 12 has three openings such as a defroster opening 24, a face opening 26, and a foot opening 28.

The defroster opening 24 is an opening through which air is blown toward an inner surface of a front glass window of a vehicle. The defroster opening 24 is opened and closed by a defroster door 25 provided inside the casing 12. The defroster door 25 is rotationally driven by a servomotor (not shown) or the like.

The face opening 26 is an opening through which air is blown toward an upper body of an occupant in the vehicle compartment through a duct (not shown). The face opening 26 is opened and closed by a face door 27 provided inside the casing 12. The face door 27 is rotationally driven by a servomotor (not shown) or the like.

The foot opening 28 is an opening through which air is blown toward a lower body of the occupant in the vehicle compartment through a duct (not shown). The foot opening 28 is opened and closed by a foot door 29 provided inside the casing 12. The foot door 29 is rotationally driven by a servomotor (not shown) or the like.

The details of the door structure of the air mixing door 50 will be described with reference to FIGS. 2 to 5. In each drawing, a direction in which the air mixing door 50 moves is shown as a door moving direction DRs, and a direction orthogonal to the door moving direction DRs on a plate surface of the air mixing door 50 is shown as a door width direction DRw.

Figure 2:
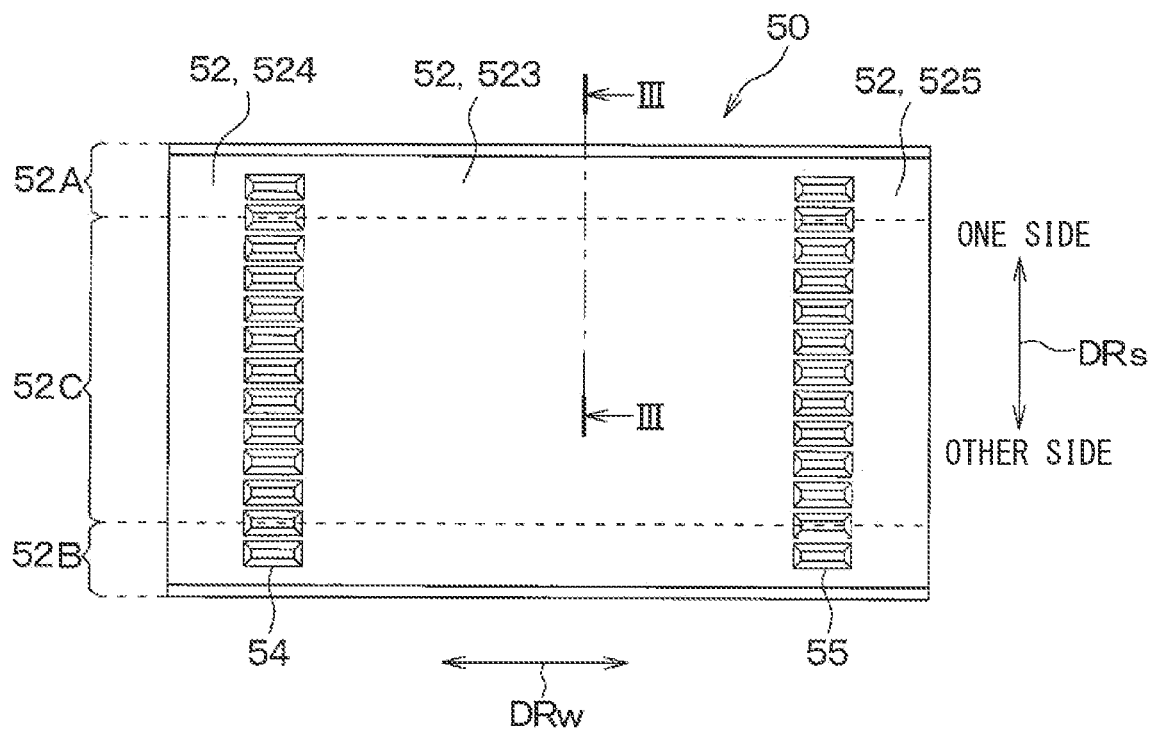
FIG. 2 is a front view showing an air mixing door according to the first embodiment.
Figure 3:
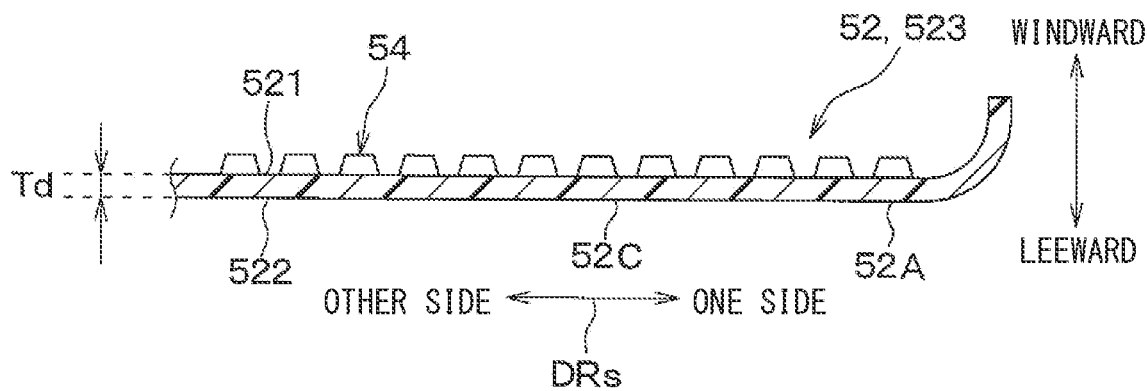
FIG. 3 is a cross-sectional view taken along III-III line in FIG. 2.

As shown in FIGS. 2 and 3, the air mixing door 50 includes a door body 52 having a plate shape, and a pair of racks 54, 55 that mesh with the pinion 32 coupled to the drive shaft 30.

The door body 52 is made of a flexible thin plate member formed of a resin such as polypropylene. The door body 52 has a door front surface 521 facing upstream (i.e. windward) in air flow in the air passage, and a door back surface 522 facing downstream (i.e. leeward) in air flow in the air passage.

The pair of racks 54 and 55 extend along the door moving direction DRs on the door front surface 521 of the door body 52. The pair of racks 54 and 55 protrude windward from the door front surface 521 of the door body 52. The pair of racks 54 and 55 are located at a portion inward of opposite ends of the door body 52 in the door width direction DRw. The pair of racks 54 and 55 are integrally molded with the door body 52. That is, the door body 52 and the pair of racks 54 and 55 constitute an integrally molded product.

As described above, the pinion 32 is coupled to the drive shaft 30 as shown in FIG. 1. Although not shown, both ends of the drive shaft 30 are rotatably supported by bearing holes formed on side wall surfaces of the casing 12. Then, one end of the drive shaft 30 is coupled to a door drive device such as a servomotor.

The door body 52 includes a cool-air end part 52A, a warm-air end part 52B and a door intermediate part 52C. The cool-air end part 52A is an end part of the door body 52 on one side in the door moving direction DRs. The warm-air end part 52B is an end part of the door body 52 on the other side in the door moving direction DRs. The door intermediate part 52C is located between the cool-air end part 52A and the warm-air end part 52B.

The cool-air end part 52A is a door end part that faces the cool-air opening edge 23 when the air mixing door 50 is positioned at a closed position where the air mixing door 50 closes the cool air opening 22a. The cool-air end part 52A is curved in an arc shape so that an edge of the cool-air end part 52A on the one side in the door moving direction DRs protrudes windward.

The warm-air end part 52B is a door end part that faces the warm-air opening edge 21 when the air mixing door 50 is positioned at a closed position where the air mixing door 50 closes the warm air opening 20a. The warm-air end part 52B is curved in an arc shape so that an edge of the warm-air end part 52B on the other side in the door moving direction DRs protrudes windward.

The door intermediate part 52C covers the cool air opening 22a when the air mixing door 50 is placed at the closed position where the air mixing door 50 closes the cool air opening 22a. The door intermediate part 52C covers the warm air opening 20a when the air mixing door 50 is placed at the closed position where the air mixing door 50 closes the warm air opening 20a.

The door intermediate part 52C is equivalent in plate thickness Td to the cool-air end part 52A and the warm-air end part 52B. As a result, the door intermediate part 52C has an equivalent rigidity as the cool-air end part 52A and the warm-air end part 52B.

Further, the door body 52 includes a body central part 523 between the pair of racks 54 and 55 in the door width direction DRw, and a pair of body lateral parts 524, 525 located outside the pair of racks 54 and 55 in the door width direction DRw.

The casing 12 includes a pair of guide rails 122, 124 that slidably support the door body 52 at positions corresponding to the pair of body lateral parts 524, 525 of the door body 52. The pair of body lateral parts 524, 525 of the door body 52 are interposed between the pair of guide rails 122, 124.

Figure 4:
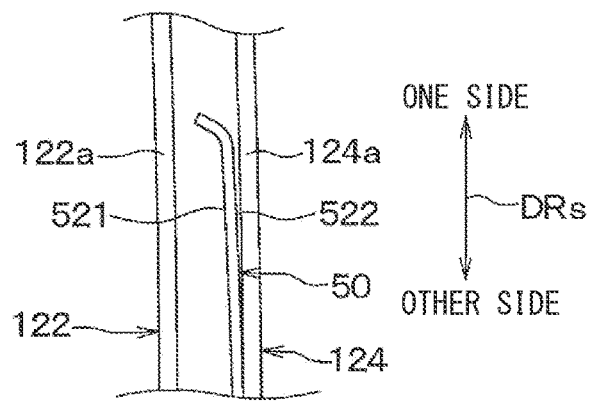
FIG. 4 is a schematic diagram illustrating a part of a guide rail.

As shown in FIG. 4, in the pair of guide rails 122, 124, a guide rail 122 located windward faces the door front surface 521 of the door body 52, and a guide rail 124 located leeward faces the door back surface 522 of the door body 52.

The pair of guide rails 122, 124 guide movement of the air mixing door 50 and extend along the door moving direction DRs. Specifically, the pair of guide rails 122, 124 have rail end parts 122a, 124a that guide opposite ends of each of the pair of body lateral parts 524, 525 in the door moving direction DRs. The rail end parts 122a, 124a also extend along the door moving direction DRs.

Further, the pair of guide rails 122, 124 are curved so as to bulge leeward so that the door body 52 is supported at three points of the door body 52 which are intermediate and both end points of the door body 52 in the door moving direction DRs. That is, the pair of guide rails 122, 124 have a shape curved in an arc shape when viewed in the door width direction DRw. The distance between the pair of guide rails 122, 124 is substantially constant in the extending direction thereof.

The pair of body lateral parts 524, 525 of the door body 52 of the air mixing door 50 are inserted between the pair of guide rails 122, 124. The door body 52 is flat in an single state. However, the door body 52 is elastically deformed along the curved shapes of the pair of guide rails 122, 124 when both ends of the door body 52 are inserted between the pair of guide rails 122, 124. The door body 52 of the air mixing door 50 is supported by the pair of guide rails 122, 124 at the three points: the intermediate and both end points of the door body 52 in the door moving direction DRs.

As shown in FIG. 1, the casing 12 includes a cool-air seal 126 that faces the cool-air end part 52A of the air mixing door 50 when the air mixing door 50 is at the closed position where the air mixing door 50 closes the cool air opening 22a. Further, the casing 12 includes a warm-air seal 128 that faces the warm-air end part 52B of the air mixing door 50 when the air mixing door 50 is at the closed position where the air mixing door 50 closes the warm air opening 20a.

Figure 5:
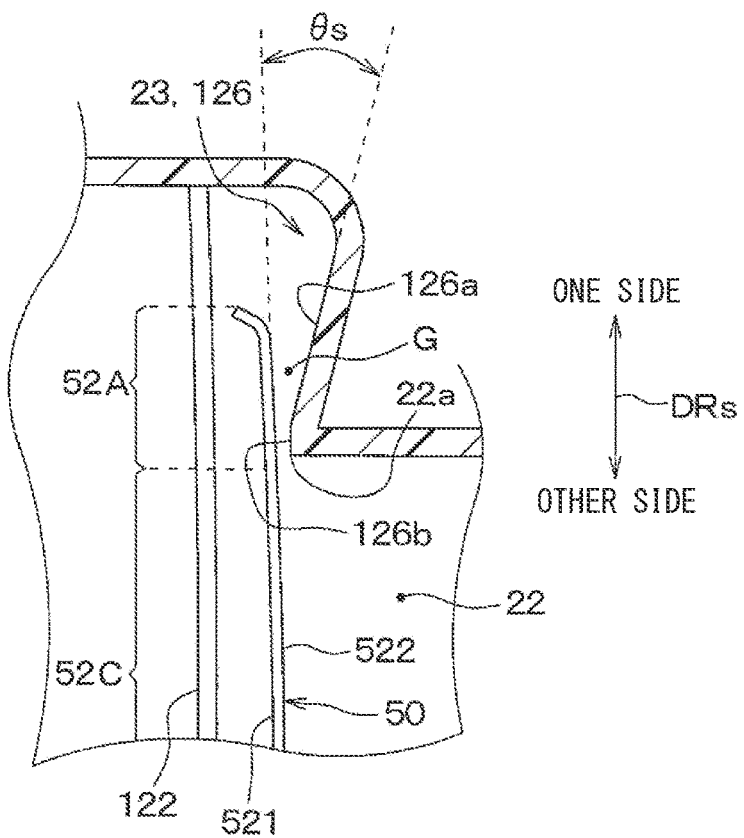
FIG. 5 is an enlarged view of a portion V of FIG. 1.

The cool-air seal 126 forms a door facing wall that defines a gap flow-path G extending along the door moving direction DRs between the cool-air seal 126 and the cool-air end part 52A. As shown in FIG. 5, the cool-air end part 52A and the cool-air seal 126 are configured so that a distance between the cool-air end part 52A and the cool-air seal 126 decreases downstream in air flow. As a result, the gap flow-path G is a tapered flow path. In other words, the distance between the cool-air end part 52A and the cool-air seal 126 decreases downstream in a flow direction of air (i.e. leakage air) leaking through the gap flow-path G. This leakage air is air that leaks from between the door end part and the door facing wall toward a passage located downstream of the opening when the sliding door is located at a position where the opening is closed. More specifically, the leakage air is air that leaks from between the cool-air end part 52A and the cool-air seal 126 toward the cool air passage 22 when the air mixing door 50 is placed at the closed position where the cool air opening 22a is closed. The leakage air flows mainly in the door moving direction DRs unlike mainstream air. The mainstream air flows through the cool air opening 22a when the air mixing door 50 is placed at the open position where the cool air opening 22a is open.

The cool-air seal 126 has an inclined portion 126a that is inclined with respect to the door moving direction DRs such that a distance between the cool-air seal 126 and the cool-air end part 52A increases with distance from the cool air opening 22a. The inclined portion 126a faces the cool-air end part 52A when the air mixing door 50 is placed at the position where the cool air opening 22a is closed.

An inclined angle θs formed between an inclined surface of the inclined portion 126a facing the cool-air end part 52A and the door moving direction DRs is an acute angle. Further, the inclined portion 126a is inclined with respect to the door moving direction DRs such that the distance between the cool-air seal 126 and the cool-air end part 52A continuously increases with distance from the cool air opening 22a. In other words, the inclined portion 126a is inclined with respect to the door moving direction DRs so that a passage area of the gap flow-path G continuously decreases in a direction toward the cool air opening 22a. At least an inner surface of the inclined portion 126a facing the cool-air end part 52A may be inclined with respect to the door moving direction DRs. For example, an outer surface of the inclined portion 126a facing away from the cool-air end part 52A may extend along the door moving direction DRs.

Portions of the cool-air end part 52A included in the pair of body lateral parts 524, 525 are guided by the pair of guide rails 122, 124. Therefore, portions of the cool-air seal 126 facing the pair of body lateral parts 524, 525 does not have the inclined portion 126a. That is, a portion of the cool-air seal 126 facing the body central part 523 has the inclined portion 126a.

In addition, the cool-air seal 126 includes a flat portion 126b between the cool air opening 22a and the inclined portion 126a. The flat portion 126b is smaller in inclination angle with respect to the door moving direction DRs than the inclined portion 126a. The flat portion 126b faces the cool-air end part 52A when the air mixing door 50 is placed at the position where the cool air opening 22a is closed.

The flat portion 126b of the cool-air seal 126 that is directly connected to the cool air opening 22a. The flat portion 126b is closer to the cool-air end part 52A than the inclined portion 126a so that the distance between the cool-air seal 126 and the cool-air end part 52A is smallest at the flat portion 126b. The flat portion 126b extends along the door moving direction DRs so that a distance between the flat portion 126b and the cool-air end part 52A is substantially constant. The flat portion 126b has a flat shape so as to extend substantially parallel to a portion of the cool-air end part 52A facing the cool-air seal 126. A length of the flat portion 126b in the door moving direction DRs is smaller than a length of the inclined portion 126a in the door moving direction DRs.

The flat portion 126b may be inclined with respect to the door moving direction DRs as long as the gap flow-path G formed between the flat portion 126b and the cool-air end part 52A is not a divergent flow path.

An electronic controller of the vehicle air conditioner will be described. Although not shown, the vehicle air conditioner includes a blower, a door drive device that rotationally drives the drive shaft 30, and an air-conditioning controller that controls operation of the servomotors that drive the doors 25, 27, and 29.

The air-conditioning controller includes a known microcontroller having a processor and a memory, and peripheral circuits. This air-conditioning controller stores an air-conditioning control program stored in the memory, and controls operation of a controlled device connected to an output side by performing various arithmetic processes based on the program.

An input side of the air-conditioning controller is connected to a sensor group and an operation panel. The sensor group is for detecting vehicle environmental conditions, such as temperature of air outside the vehicle compartment, temperature of air inside the vehicle compartment, and an amount of solar radiation entering into the vehicle compartment. The operation panel is provided with an operation switch for turning on and off air conditioning of the vehicle compartment, and a temperature setting switch for setting a set temperature of the vehicle compartment.

Next, an operation of the vehicle air conditioner including the above-mentioned interior air-conditioning unit 10 will be described. In a state of the vehicle operating, when the operation switch is turned on, the air-conditioning controller of the vehicle air conditioner executes an air-conditioning control program stored in the memory. That is, the air-conditioning controller reads detection signals of the sensor group and operation signals of the operation panel, and calculates a target blowout temperature TAO of air blown into the vehicle compartment based on various signals. Then, the air-conditioning controller determines a rotation speed of the blower, a driven position of the air mixing door 50, and an open/closed state of each of the doors 25, 27 and 29 based on the target blowout temperature TAO and the like. The air-conditioning controller outputs control signals to various controlled devices to become into the determined control states. The air-conditioning controller periodically executes a series of routines such as reading the various signals, determining the control states, and outputting the control signals to the various controlled devices.

When the air-conditioning controller outputs a control signal to a door drive device (not shown) to rotate the drive shaft 30, the pinion 32 connected to the drive shaft 30 meshes with the racks 54, 55 provided on the door body 52 and the air mixing door 50 slides.

Figure 6:
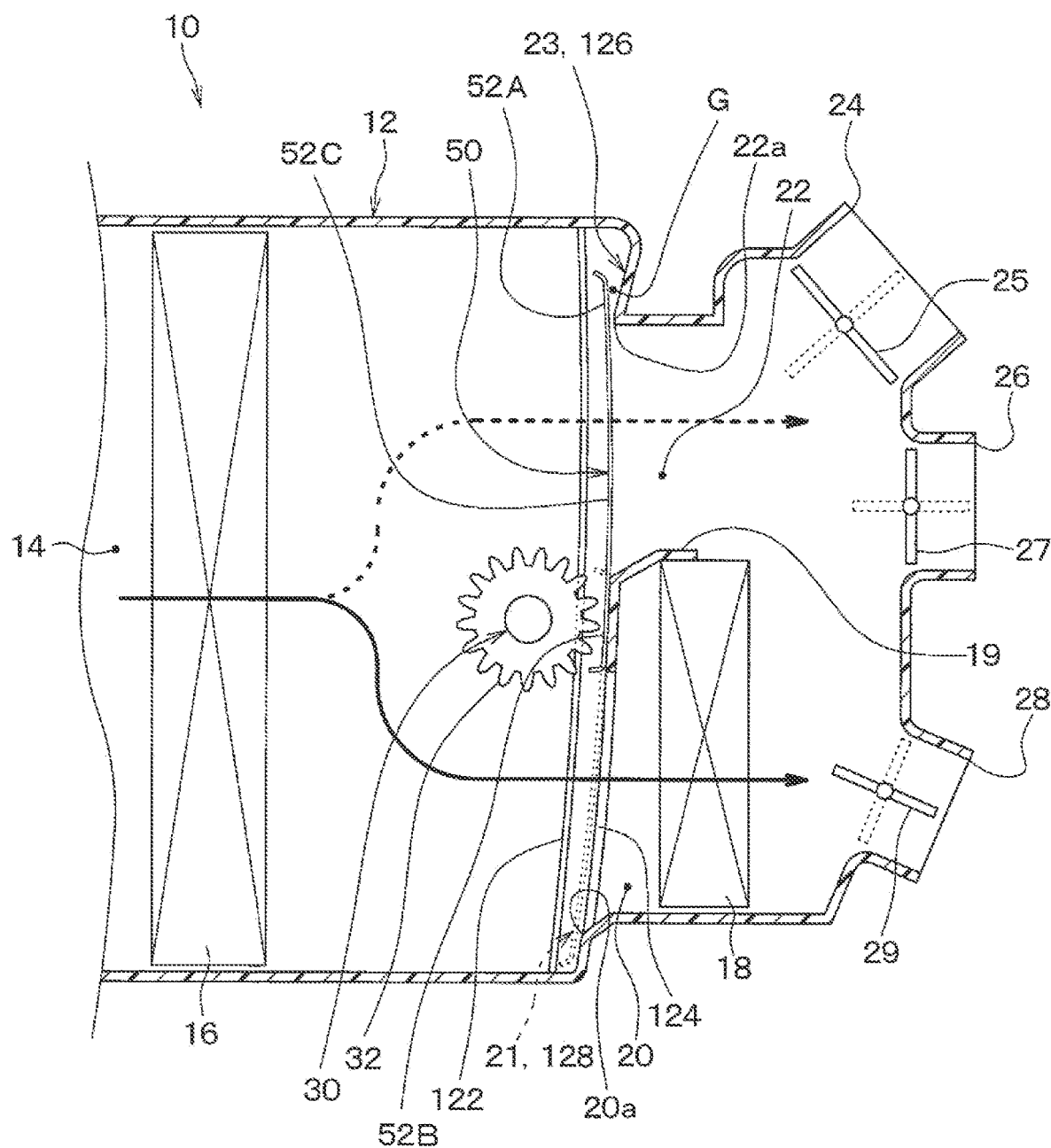
FIG. 6 is a diagram illustrating how air flows in the interior air-conditioning unit.

In the interior air-conditioning unit 10, as shown by the broken line in FIG. 6, when the air mixing door 50 is in the position where the warm air opening 20a is closed, cool air adjusted to a desired temperature by the evaporator 16 bypasses the heater core 18 and then is blown out into the vehicle compartment through a predetermined opening. According to this, the interior of the vehicle compartment is provided with air having a lower temperature than air outside the vehicle compartment.

Further, in the interior air-conditioning unit 10, as shown by the solid line in FIG. 6, when the air mixing door 50 is in the position where the cool air opening 22a is closed, air passing through the evaporator 16 is heated to a desired temperature in the heater core 18 and then is blown out into the vehicle compartment through a predetermined opening. According to this, the interior of the vehicle compartment is provided with air having a higher temperature than air outside the vehicle compartment.

When the air mixing door 50 is at the position where the cool air opening 22a is closed, a part of the cool-air end part 52A contacts the cool-air seal 126. Therefore, leakage of cool air to the cool air passage 22 can be reduced.

Figure 7:
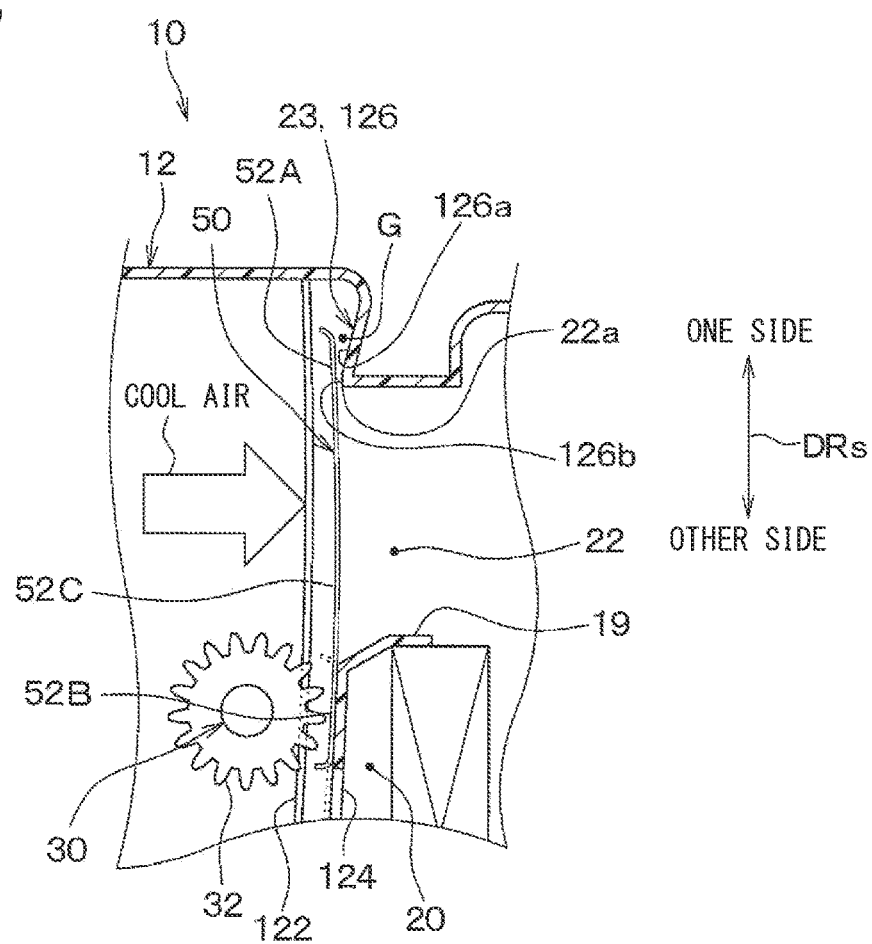
FIG. 7 is a diagram illustrating a state of the air mixing door when the air mixing door is positioned at a closed position of a cool air opening.

However, a sealing property between the cool-air seal 126 and the cool-air end part 52A may become insufficient. In this case, as shown in FIG. 7, self-excited vibration of the air mixing door 50 may occur by creation of the small gap flow-path G extending in the door moving direction DRs between the cool-air seal 126 and the cool-air end part 52A. At the time of the self-excited vibration of the air mixing door 50, an abnormal noise is generated due to collisions between the cool-air seal 126 and the cool-air end part 52A.

Figure 8:
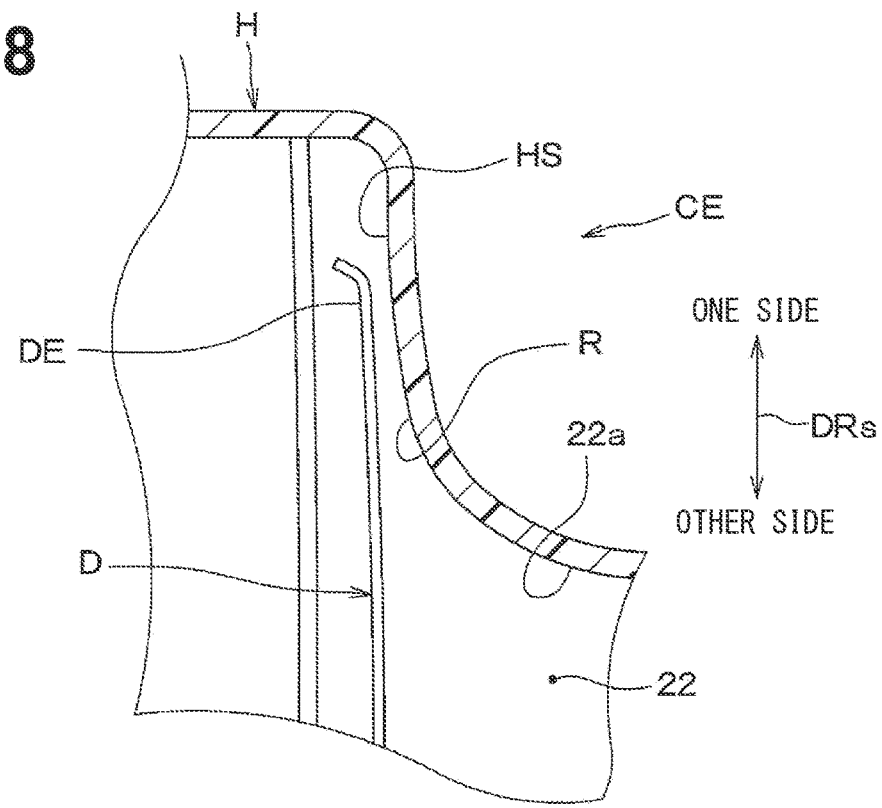
FIG. 8 is a diagram illustrating a door structure including an air mixing door according to a comparative example of the first embodiment.

FIG. 8 is a diagram illustrating a door structure CE including an air mixing door D according to a comparative example of the present embodiment. In the door structure CE shown in FIG. 8, a distance between the door end part DE of the air mixing door D and a cool-air seal HS of a casing H increases downstream in air flow so that a gap flow-path G formed between the door end part DE and the cool-air seal HS becomes a divergent flow path. More specifically, the door structure CE has a curved portion R that curves in an arc shape with respect to the cool-air seal HS so that a distance between the curved portion R and the cool-air end part 52A increases in a direction toward the cool air opening 22a. The door end part DE of the air mixing door D corresponds to the cool-air end part 52A of the air mixing door 50 of the present embodiment. The cool-air seal HS of the casing H corresponds to the cool-air seal 126 of the casing 12 of the present embodiment.

Figure 9:
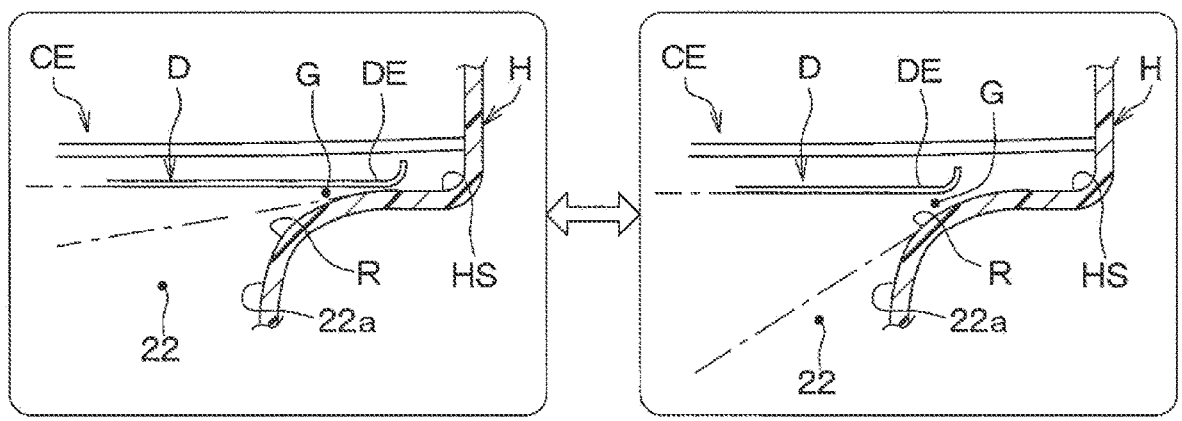
FIG. 9 is a diagram illustrating a gap flow-path defined by a door end of the air mixing door and a cool-air seal of a casing, according to the comparative example of the first embodiment.

As shown in FIG. 9, in the door structure CE of the comparative example, the gap flow-path G between the door end part DE and the cool-air seal HS becomes a divergent flow path when the air mixing door 50 is located at a closed position where the cool air opening 22a is closed or at a slightly open position where the cool air opening 22a is slightly open.

Figure 10:
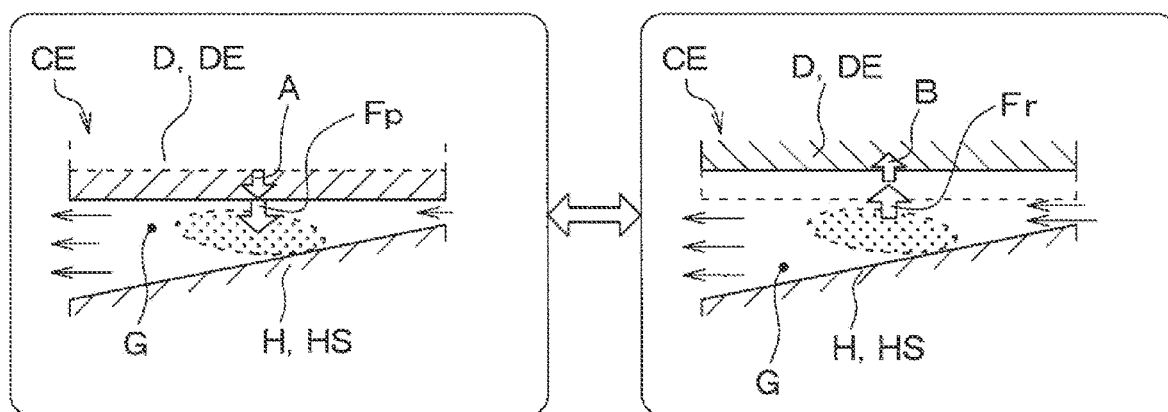
FIG. 10 is a diagram illustrating an unsteady fluid force acting on the air mixing door according to the comparative example of the first embodiment.

The left frame of FIG. 10 shows that the door end part DE of the air mixing door D changes in position with time at a speed in a direction approaching the cool-air seal HS of the casing H due to vibration as shown by the arrow A in the gap flow-path G which is the divergent flow path. At this time, a rate of change in flow path area of the gap flow-path G per unit time is larger on an inlet side than on an outlet side. That is, a rate of increase in pressure loss of the gap flow-path G per unit time is larger on the inlet side than on the outlet side, and increase in flow path resistance is dominant on the inlet side. The rate of change in flow path area of the gap flow-path G per unit time is smaller on the outlet side than on the inlet side. Therefore, fluid inertia is dominant on the outlet side.

As described above, in the door structure CE of the comparative example, when the door end part DE changes in position with time at speed in the direction approaching the cool-air seal HS of the casing H, an inflow amount of air into the gap flow-path G sharply decreases while there is no significant change in outflow amount of air on the outlet side. As a result, pressure in the gap flow-path G decreases. As a result, an unsteady fluid force Fp acts on the air mixing door 50. This unsteady fluid force Fp is a force in a direction of the door end part DE becoming closer to the cool-air seal HS and thus acts in the same direction as vibration thereof. Therefore, the unsteady fluid force Fp acts in the direction of amplifying the vibration.

On the other hand, the left frame of FIG. 10 shows that the door end part DE of the air mixing door D changes in position with time at speed in a direction away from the cool-air seal HS of the casing H due to vibration as shown by the arrow B in the gap flow-path G which is the divergent flow path. At this time, a rate of change in flow path area of the gap flow-path G per unit time is larger on an inlet side than on an outlet side. That is, a rate of decrease in pressure loss of the gap flow-path G per unit time is larger on the inlet side than on the outlet side, and decrease in flow path resistance is dominant on the inlet side. The rate of change in flow path area of the gap flow-path G per unit time is smaller on the outlet side than on the inlet side. Therefore, fluid inertia is dominant on the outlet side.

As described above, in the door structure CE of the comparative example, when the door end part DE changes in position with time at speed in the direction away from the cool-air seal HS of the casing H, an inflow amount of air into the gap flow-path G sharply increases while there is no significant change in outflow amount of air on the outlet side. As a result, pressure in the gap flow-path G increases. As a result, an unsteady fluid force Fr acts on the air mixing door 50. This unsteady fluid force Fr is a force in a direction of the door end part DE becoming farther from the cool-air seal HS and thus acts in the same direction as vibration thereof. Therefore, the unsteady fluid force Fr acts in the direction of amplifying the vibration.

As described above, in the door structure CE of the comparative example having the divergent gap flow-path G, the unsteady fluid force acts on the air mixing door D in the direction of amplifying the vibration. Therefore, the vibration is easy to occur.

Figure 11:
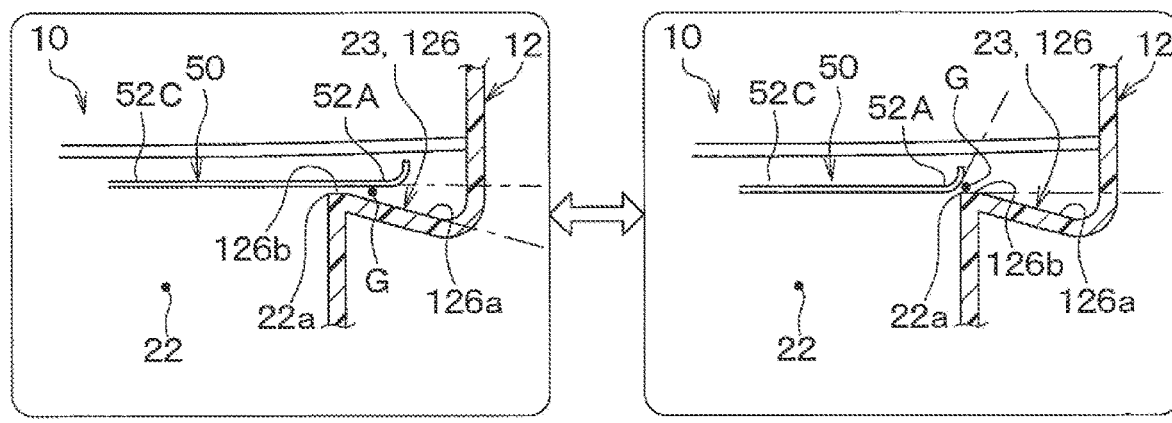
FIG. 11 is a diagram illustrating a gap flow-path formed by a cool-air end part of the air mixing door and a cool-air seal of a casing, according to the first embodiment.

On the other hand, as shown in FIG. 11, in the door structure of the air mixing door 50 of the present embodiment, the gap flow-path G between the cool-air end part 52A and the cool-air seal 126 becomes a convergent flow path when the air mixing door 50 is located at a closed position where the cool air opening 22a is closed or at a slightly open position where the cool air opening 22a is slightly open.

Figure 12:
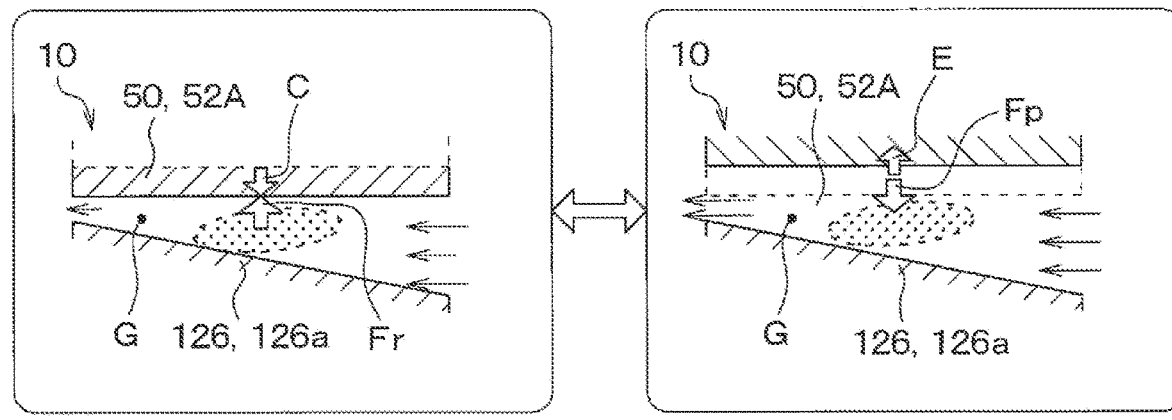
FIG. 12 is a diagram illustrating an unsteady fluid force acting on the air mixing door according to the first embodiment.

The left frame of FIG. 12 shows that the cool-air end part 52A of the air mixing door 50 changes in position with time at speed in a direction approaching the cool-air seal 126 due to vibration as shown by the arrow C in the gap flow-path G which is the convergent flow path. At this time, a rate of change in flow path area of the gap flow-path G per unit time is larger on an outlet side than on an inlet side. That is, a rate of increase in pressure loss of the gap flow-path G per unit time is larger on the outlet side than on the inlet side, and increase in flow path resistance is dominant on the outlet side. The rate of change in flow path area of the gap flow-path G per unit time is smaller on the inlet side than on the outlet side. Therefore, fluid inertia is dominant on the inlet side.

As described above, in the door structure of the air mixing door 50, when the cool-air end part 52A changes in position with time at speed in the direction approaching the cool-air seal 126, an outflow amount of air from the gap flow-path G sharply decreases while there is no significant change in inflow amount of air on the inlet side. As a result, pressure in the gap flow-path G increases. As a result, an unsteady fluid force Fr acts on the air mixing door 50. This unsteady fluid force Fr is a force in a direction of the cool-air end part 52A becoming farther from the cool-air seal 126 and thus acts in the opposite direction from vibration thereof. Therefore, the unsteady fluid force Fr acts in a direction of attenuating the vibration.

On the other hand, the right frame of FIG. 12 shows that the cool-air end part 52A of the air mixing door 50 changes in position with time at speed in a direction away from the cool-air seal 126 due to vibration as shown by the arrow E in the gap flow-path G which is the convergent flow path. At this time, a rate of change in flow path area of the gap flow-path G per unit time is larger on the outlet side than on the inlet side. That is, a rate of decrease in pressure loss of the gap flow-path G per unit time is larger on the outlet side than on the inlet side, and decrease in flow path resistance is dominant on the outlet side. The rate of change in flow path area of the gap flow-path G per unit time is smaller on the inlet side than on the outlet side. Therefore, fluid inertia is dominant on the inlet side.

As described above, in the door structure of the air mixing door 50, when the cool-air end part 52A changes in position with time at speed in the direction away from the cool-air seal 126, an outflow amount of air from the gap flow-path G sharply increases while there is no significant change in inflow amount of air on the inlet side. As a result, pressure in the gap flow-path G decreases. Therefore, an unsteady fluid force Fp acts on the air mixing door 50. This unsteady fluid force Fp is a force in a direction of the cool-air end part 52A becoming closer to the cool-air seal 126 and thus acts in the opposite direction from vibration thereof. Therefore, the unsteady fluid force Fp acts in a direction of attenuating the vibration.

In the door structure of the present embodiment including the convergent gap flow-path G, since the unsteady fluid force acts on the air mixing door 50 in the direction of attenuating the vibration, an effect of suppressing the self-excited vibration can be sufficiently obtained.

The present inventors have verified the self-excited vibration of the sliding door in an actual machine. According to this verification, in the door structure CE of the comparative example, the self-excited vibration occurs when the distance between the door end part DE and the cool-air seal HS is longer than a first reference value Gs or more, and a pressure difference front and rear sides the air mixing door D is higher than a first reference difference ΔP or more. On the other hand, in the door structure of the present embodiment, the self-excited vibration does not occur even when the distance between the cool-air end part 52A and the cool-air seal 126 is twice or more of the first reference value Gs, and a pressure difference between front and rear sides of the air mixing door 50 is 3 times or more of the first reference difference ΔP.

In the interior air-conditioning unit 10 described above, the distance between the cool-air end part 52A of the air mixing door 50 and the cool-air seal 126 of the casing 12 decreases downstream in the air flow. Since the unsteady fluid force acts on the air mixing door 50 in the direction of attenuating the vibration, the self-excited vibration of the air mixing door 50 can be suppressed. As a result, generation of abnormal noise due to the self-excited vibration of the air mixing door 50 can be reduced.

In addition, in the door structure of the present embodiment, it is unnecessary to form a spring structure or attach a bristle material or packing to the air mixing door 50. Therefore, the self-excited vibration of the air mixing door 50 can be suppressed while deterioration in manufacturability of the air mixing door 50 is reduced.

Further, according to the door structure of the present embodiment, the gap flow-path G formed between the cool-air end part 52A and the cool-air seal 126 is a convergent flow path. Thus, a sealing area between the cool-air end part 52A and the cool-air seal 126 can be reduced. Since an area of contact between the cool-air end part 52A and the cool-air seal 126 becomes small, a door operating force required for opening and closing the cool air opening 22*a* with the air mixing door 50 can be reduced.

Further, according to the door structure of the present embodiment, the sealing area in which the cool-air end part 52A and the cool-air seal 126 are in contact with each other can be reduced. Therefore, it is possible to reduce the number of man-hours such as making a mold for the sealing area in order to secure the sealing property.

The cool-air seal 126 has an inclined portion 126*a* that is inclined with respect to the door moving direction DRs such that a distance between the cool-air seal 126 and the cool-air end part 52A increases with distance from the cool air opening 22*a*. As a result, a convergent flow path can be formed between the cool-air seal 126 and the cool-air end part 52A.

In addition, the cool-air seal 126 includes a flat portion 126*b* between the cool air opening 22*a* and the inclined portion 126*a*. The flat portion 126*b* is smaller in inclination angle with respect to the door moving direction DRs than the inclined portion 126*a*. According to this, when the air mixing door 50 is placed at the closed position, the contact area (i.e. the sealing area) between the cool-air end part 52A of the air mixing door 50 and the cool-air seal 126 can be easily secured. This greatly contributes to the improvement in the sealing property of the air mixing door 50.

If an end of the leeward guide rail 124 of the pair of guide rails 122, 124 is inclined with respect to the door moving direction DRs similar to the cool-air seal 126, the cool-air end part 52A may be tilt with respect to the door moving direction DRs by wind pressure caused when the cool air opening 22*a* is closed. The tilting of the cool-air end part 52A with respect to the door moving direction DRs causes a factor that makes it difficult to move the air mixing door 50 in the door moving direction DRs.

Figure 13:
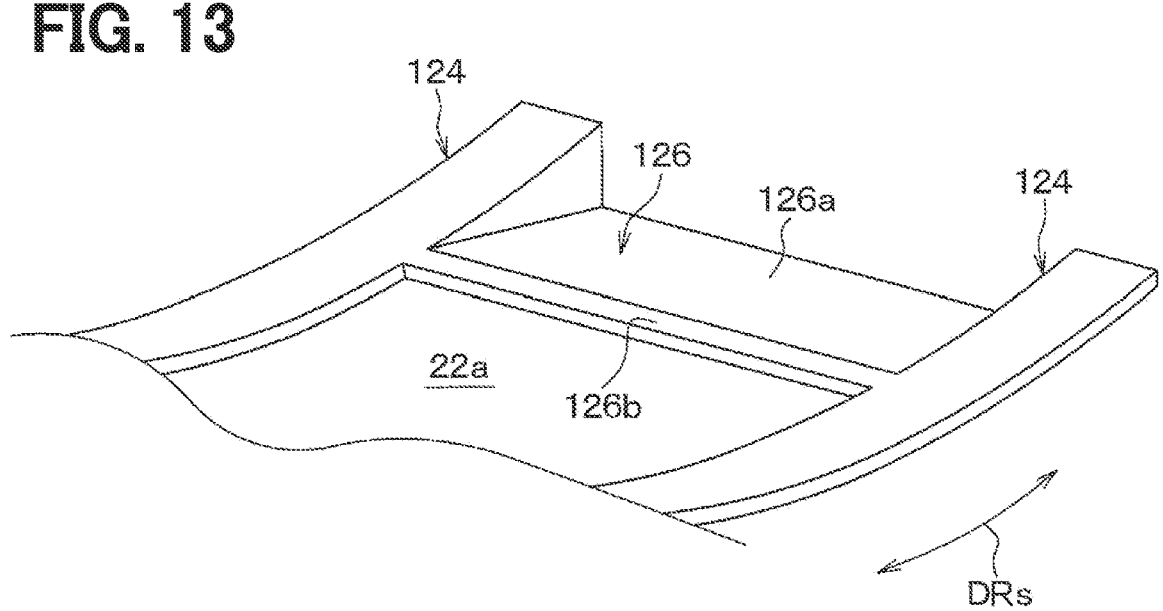
FIG. 13 is a schematic perspective view showing the cool-air seal and its vicinity inside the casing.

On the other hand, in the door structure of the present embodiment, the pair of guide rails 122, 124 that guide the movement of the air mixing door 50 entirely extends along the door moving direction DRs. More specifically, as shown in FIG. 13, the end of the leeward guide rail 124 of the pair of guide rails 122, 124 extends along the door moving direction DRs, unlike the cool-air seal 126. According to this, even if the inclined portion 126*a* is formed on the cool-air seal 126, the air mixing door 50 can be displaced in the door moving direction DRs along the pair of guide rails 122, 124. That is, according to the door structure of the present embodiment, a convergent flow path can be formed between the cool-air seal 126 and the cool-air end part 52A while displacing the air mixing door 50 in the door moving direction DRs.

Modification of First Embodiment

As described in the above embodiment, it is preferable that the flat portion 126*b* is formed on the cool-air seal 126, but the cool-air seal 126 is not limited to this. The cool-air seal 126 may be formed, for example, so that the inclined portion 126a is directly connected to the cool air opening 22a.

Second Embodiment

Next, a second embodiment will be described with reference to FIG. 14. In the present embodiment, differences from the first embodiment will be mainly described.

Figure 14:
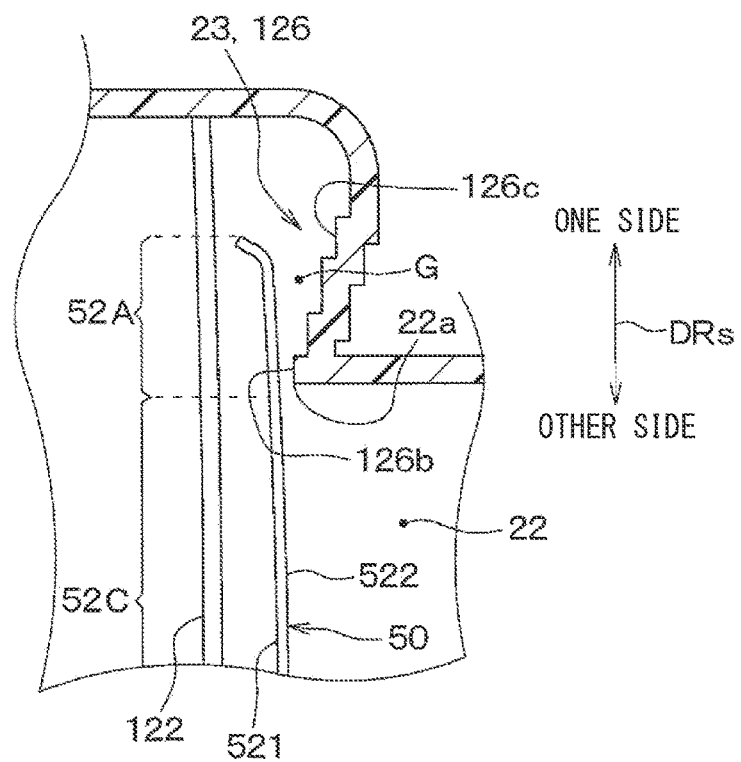
FIG. 14 is a diagram illustrating a relationship between a cool-air end part of an air mixing door and a cool-air seal of a casing, according to a second embodiment.

As shown in FIG. 14, the cool-air seal 126 has an inclined portion 126c that is inclined stepwise with respect to the door moving direction DRs such that a distance between the cool-air seal 126 and the cool-air end part 52A increases with distance from the cool air opening 22a.

The inclined portion 126c faces the cool-air end part 52A when the air mixing door 50 is placed at the position where the cool air opening 22a is closed. Further, the inclined portion 126c is inclined with respect to the door moving direction DRs such that the distance between the cool-air seal 126 and the cool-air end part 52A increases stepwise with distance from the cool air opening 22a. In other words, the inclined portion 126c is inclined stepwise with respect to the door moving direction DRs so that a passage area of the gap flow-path G decreases stepwise in a direction toward the cool air opening 22a. At least an inner surface of the inclined portion 126c facing the cool-air end part 52A may be inclined stepwise with respect to the door moving direction DRs.

The other configurations are the same as those of the first embodiment. The door structure of the air mixing door 50 of the present embodiment can provide the same effects as those of the first embodiment, which are common to or equivalent to those of the first embodiment.

Modification of Second Embodiment

In the second embodiment, the cool-air seal 126 is provided with the inclined portion 126c inclined stepwise, but the cool-air seal 126 is not limited to this. The cool-air seal 126 may be provided with, for example, an inclined portion having both a continuously inclined portion and a stepwise inclined portion. Further, the cool-air seal 126 may be formed with an inclined portion having a curved surface such that a tangent line of the curved surface intersects the door moving direction DRs.

Third Embodiment

Next, a third embodiment will be described with reference to FIG. 15. In the present embodiment, differences from the first embodiment will be mainly described.

Figure 15:
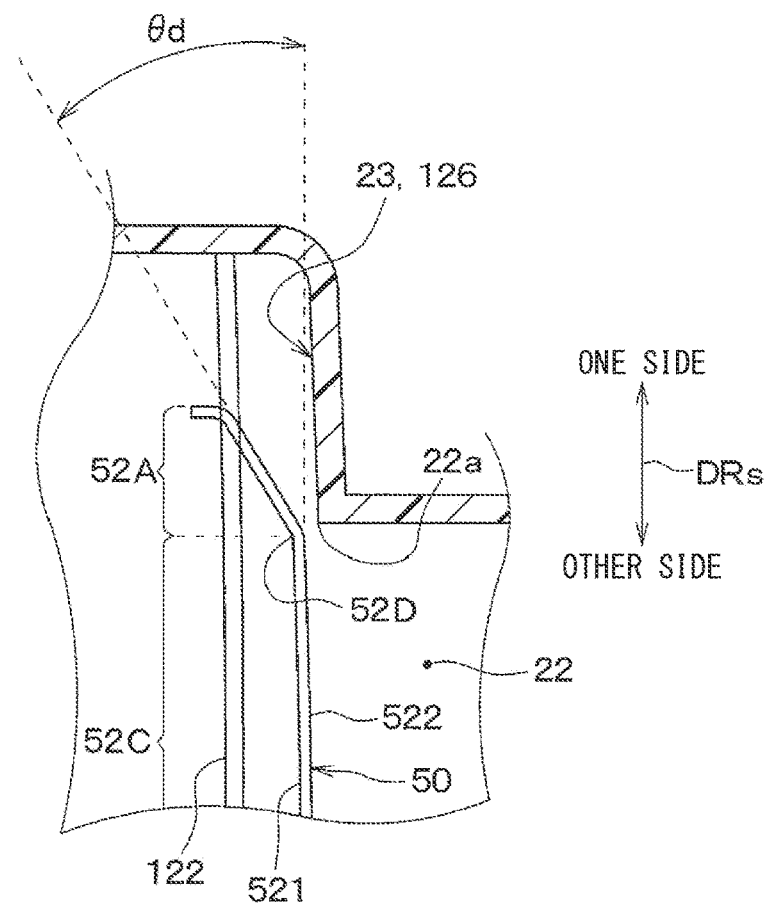
FIG. 15 is a diagram illustrating a relationship between a cool-air end part of an air mixing door and a cool-air seal of a casing, according to a third embodiment.

As shown in FIG. 15, the cool-air seal 126 does not have the inclined portion 126a and extends along the door moving direction DRs. That is, the cool-air seal 126 has a flat shape as a whole along the door moving direction DRs.

On the other hand, the cool-air end part 52A of the air mixing door 50 is inclined with respect to the door moving direction DRs such that a distance between the cool-air end part 52A and the cool-air seal 126 increases in a direction away from the cool air opening 22a when the air mixing door 50 is placed at a position where the cool air opening 22a is closed.

An inclined angle θd formed between the cool-air end part 52A and the door moving direction DRs is an acute angle. A bent portion 52D, which is a starting point of bending, is provided at a connection portion between the cool-air end part 52A and the door intermediate part 52C. Since the air mixing door 50 has a corner portion by the bent portion 52D, the cool-air end part 52A is inclined with respect to the door moving direction DRs.

The air mixing door 50 having such a shape can be obtained through a simple manufacturing method, for example, forming the racks 54 and 55 by press molding and then bending the formed body. The air mixing door 50 may be manufactured by another manufacturing method.

The other configurations are the same as those of the first embodiment. The door structure of the air mixing door 50 of the present embodiment can provide the same effects as those of the first embodiment, which are common to or equivalent to those of the first embodiment.

In the door structure of the air mixing door 50 of the present embodiment, the cool-air end part 52A is inclined with respect to the door moving direction DRs such that the distance between the cool-air end part 52A and the cool-air seal 126 increases in the direction away from the cool air opening 22a when the air mixing door 50 is placed at the closed position where the cool air opening 22a is closed. Therefore, such inclination of the cool-air end part 52A of the air mixing door 50 can provide a convergent flow path between the cool-air seal 126 and the cool-air end part 52A.

In addition, the air mixing door 50 of the present embodiment can be obtained through a simple manufacturing method. Therefore, in the door structure of the air mixing door 50 of the present embodiment, the self-excited vibration of the air mixing door 50 can be suppressed while deterioration in manufacturability of the air mixing door 50 is reduced.

Modification of Third Embodiment

In the above-mentioned third embodiment, the air mixing door 50 is exemplified in which the bent portion 52D which is the starting point of bending is provided at the connection portion between the cool-air end part 52A and the door intermediate part 52C. However, the air mixing door 50 is not limited to this. The air mixing door 50 may be provided with, for example, an arcuate curved portion serving as a starting point of bending at the connection portion between the cool-air end part 52A and the door intermediate part 52C. Further, the starting point of bending is not limited to the connection portion between the cool-air end part 52A and the door intermediate part 52C. The starting point of bending may be provided between the connection portion and the door intermediate part 52C or between the connection portion and the cool-air end part 52A.

In the above-mentioned third embodiment, the cool-air seal 126 is not provided with the inclined portion 126a described in the first embodiment, but the door structure of the air mixing door 50 is not limited to this. The door structure of the air mixing door 50 may be realized, for example, by providing the cool-air seal 126 having the inclined portion 126a described in the first embodiment while the cool-air end part 52A being inclined with respect to the door moving direction DRs. In the door structure of the air mixing door 50, the gap flow-path G formed between the cool-air end part 52A and the cool-air seal 126 may be a convergent flow path at least. In the door structure, for example, as long as the gap flow-path G is the convergent flow path, the cool-air seal 126 may extend windward in a direction away from the cool air opening 22a, or the cool-air end part 52A may extend leeward in the direction away from the cool air opening 22a.

Fourth Embodiment

Next, a fourth embodiment will be described with reference to FIGS. 16 to 18. In the present embodiment, differences from the first embodiment will be mainly described.

Figure 16:
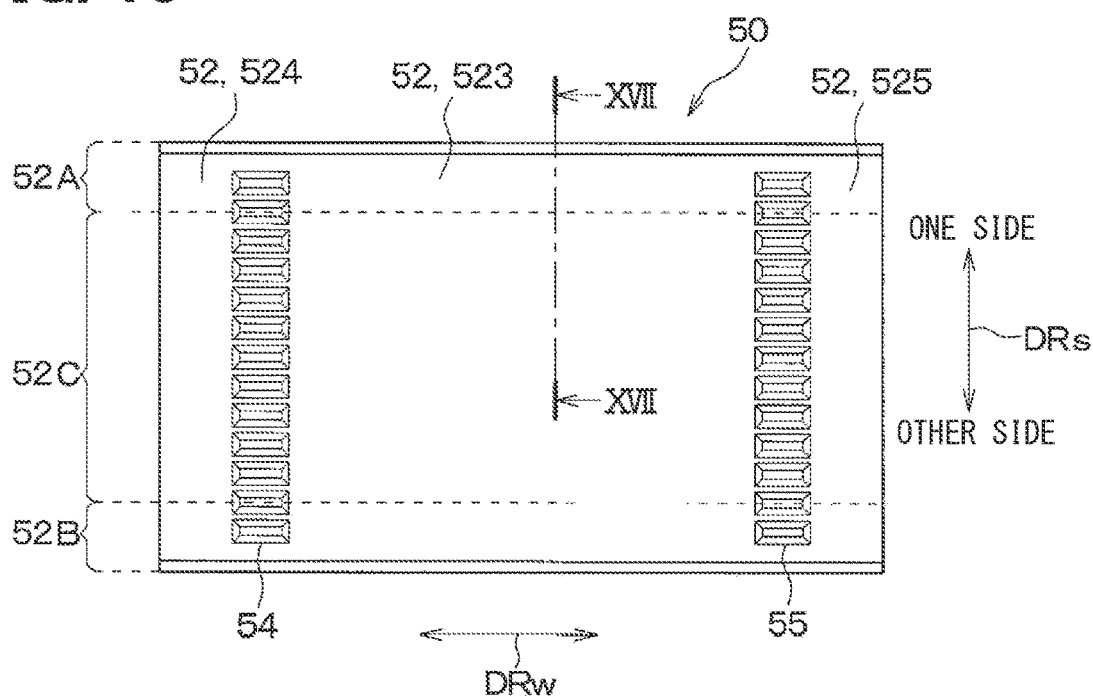
FIG. 16 is a front view showing an air mixing door according to a fourth embodiment.

As shown in FIG. 16, the air mixing door 50 has a cool-air end part 52A, a warm-air end part 52B, and a door intermediate part 52C. The door intermediate part 52C has at least a part lower in rigidity than the cool-air end part 52A.

Figure 17:
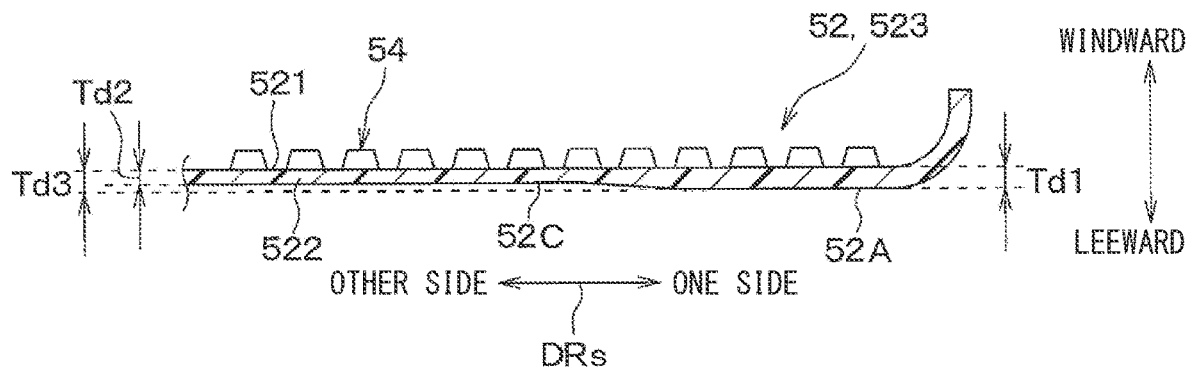
FIG. 17 is a cross-sectional view taken along line XVII-XVII of FIG. 16.
Figure 18:
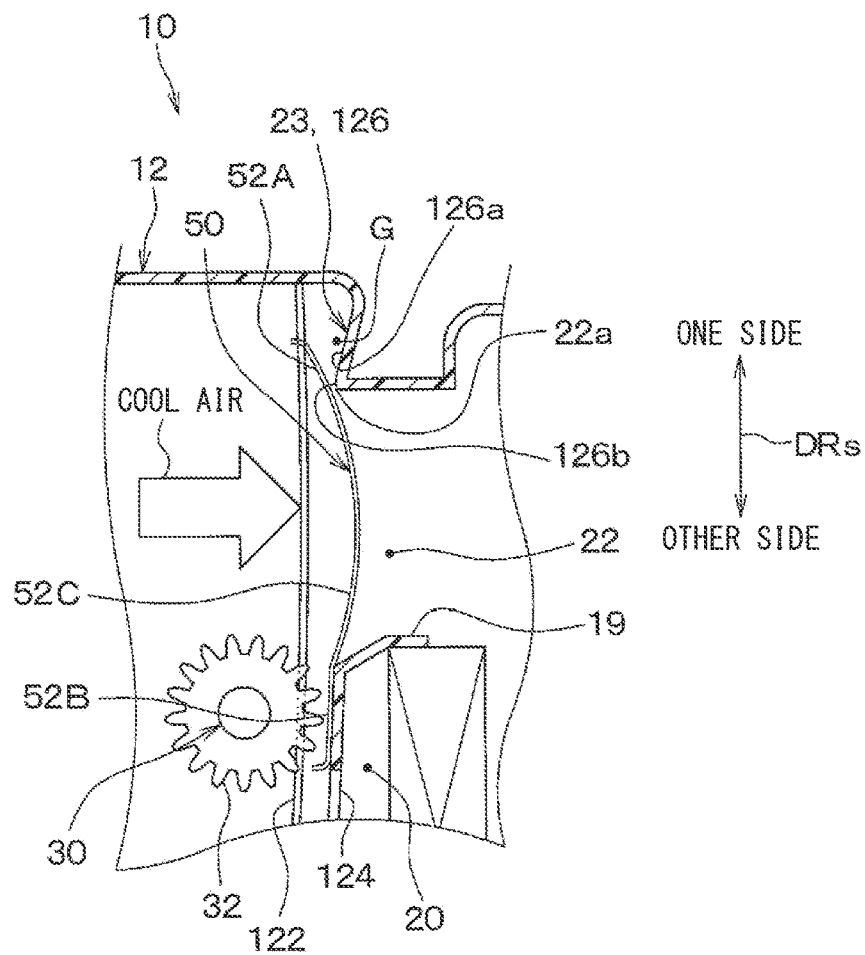
FIG. 18 is a diagram illustrating a relationship between a cool-air end part of an air mixing door and a cool-air seal of a casing, according to the fourth embodiment.

As shown in FIG. 17, a plate thickness Td2 of the door intermediate part 52C is smaller than a plate thickness Td1 of the cool-air end part 52A. Specifically, in the door intermediate part 52C, the plate thickness Td2 of the body central part 523 that receives wind pressure when the air mixing door 50 is placed at a position where the cool air opening 22a is closed is smaller than the plate thickness Td1 of the cool-air end part 52A. That is, in the door intermediate part 52C, a plate thickness Td3 of a pair of body lateral parts 524, 525 guided by a pair of guide rails 122, 124 is about the same as the plate thickness Td1 of the cool-air end part 52A.

In the air mixing door 50 of the present embodiment, the door intermediate part 52C and the cool-air end part 52A are coplanar with each other on a door front surface 521, and the door intermediate part 52C is recessed and located windward of the cool-air end part 52A on the door back surface 522. In the air mixing door 50, for example, the door intermediate part 52C may be recessed and located leeward of the cool-air end part 52A on the door front surface 521, and the door intermediate part 52C and the cool-air end part 52A may be coplanar with each other on the door back surface 522. In the air mixing door 50, for example, the door intermediate part 52C may be recessed and located leeward of the cool-air end part 52A on the door front surface 521, and the door intermediate part 52C may be recessed and located windward of the cool-air end part 52A on the door back surface 522.

The other configurations are the same as those of the first embodiment. The door structure of the air mixing door 50 of the present embodiment can provide the same effects as those of the first embodiment, which are common to or equivalent to those of the first embodiment.

In particular, in the air mixing door 50 of the present embodiment, rigidity of the door intermediate part 52C of the air mixing door 50 is small. Therefore, as shown in FIG. 18, when the air mixing door 50 is placed at the closed position where the cool air opening 22a is closed, the door intermediate part 52C is easily deformed to become convex leeward by the wind pressure acting on the air mixing door 50. In the air mixing door 50, when the door intermediate part 52C becomes convex leeward, the cool-air end part 52A is tilted from the door moving direction DRs such that a distance between the cool-air end part 52A and the cool-air seal 126 increases with distance from the cool air opening 22a. Therefore, even when the rigidity of the door intermediate part 52C of the air mixing door 50 is small, a convergent flow path can be formed between the cool-air seal 126 and the cool-air end part 52A. Therefore, also in the door structure of the air mixing door 50 of the present embodiment, the self-excited vibration of the air mixing door 50 can be suppressed while deterioration in manufacturability of the air mixing door 50 is reduced.

Modification of Fourth Embodiment

Figure 19:
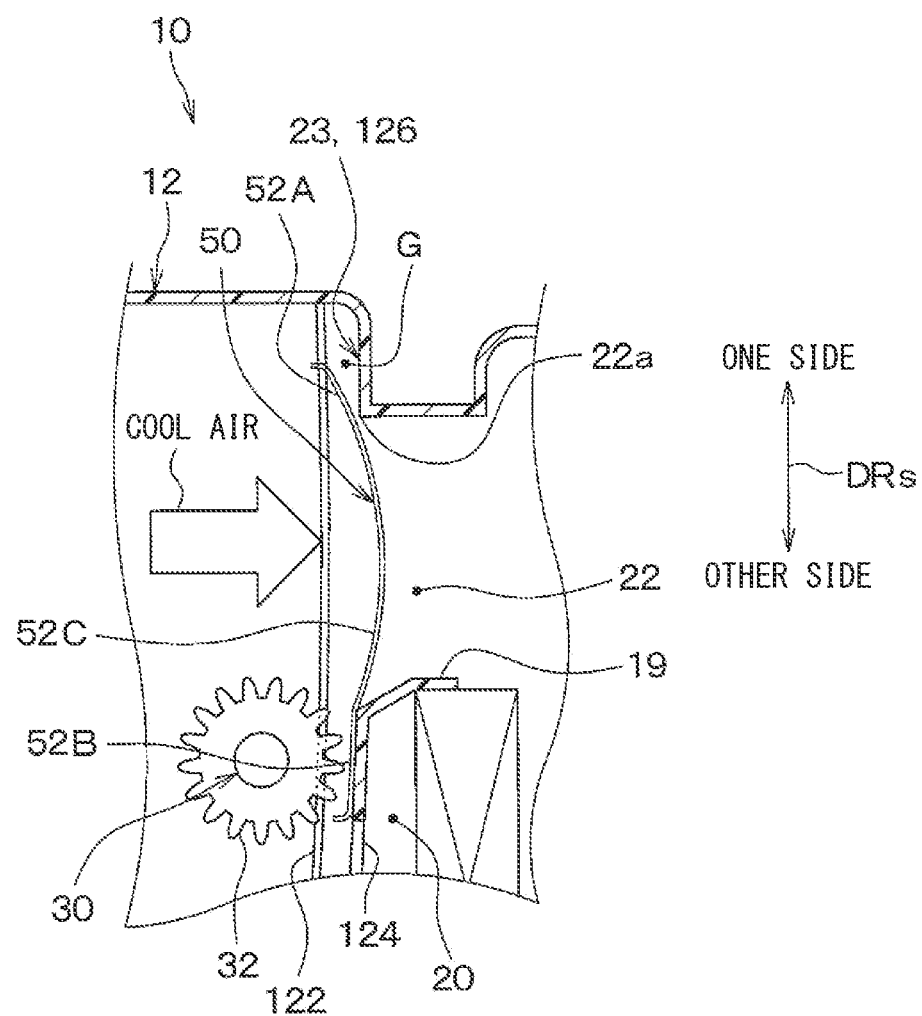
FIG. 19 is a diagram illustrating a relationship between a cool-air end part of an air mixing door and a cool-air seal of a casing, according to a modification of the fourth embodiment.

In the above-mentioned fourth embodiment, the cool-air seal 126 having the inclined portion 126a is exemplified, but the door structure of the air mixing door 50 is not limited to this. In the door structure of the air mixing door 50, the cool-air seal 126 may not be provided with the inclined portion 126a as long as the gap flow-path G formed between the cool-air end part 52A and the cool-air seal 126 is a convergent flow path. That is, in the door structure of the air mixing door 50 shown in the fourth embodiment, for example, as shown in FIG. 19, the cool-air seal 126 may not be provided with the inclined portion 126a, and the cool-air seal 126 may extend along the door moving direction DRs.

In the above-mentioned fourth embodiment, the door intermediate part 52C is exemplified in which the plate thickness Td3 of the pair of body lateral parts 524, 525 is about the same as the plate thickness Td1 of the cool-air end part 52A. However, the door intermediate part 52C is not limited to this. In the door intermediate part 52C, for example, the plate thickness Td3 of the pair of body lateral parts 524, 525 may be smaller than the plate thickness Td1 of the cool-air end part 52A.

In the above-mentioned fourth embodiment, the rigidity of the door intermediate part 52C is reduced by reducing the plate thickness Td2 of the door intermediate part 52C, but the air mixing door 50 is not limited to this.

Other Embodiments

Although representative embodiments of the present disclosure have been described above, the present disclosure is not limited to the embodiments described above, and various modifications can be made, for example, as follows.

As in the above-described embodiments, it is preferable that the pair of guide rails 122, 124 and the respective seals 126, 128 have curved shapes so as to bulge downstream in the airflow, but the present disclosure is not limited to this, for example, they may have linear shapes.

In the above-described embodiments, the air mixing door 50 formed of a resin is exemplified, but the present disclosure is not limited thereto. The air mixing door 50 is not limited to the resin, and may be made of, for example, a thin metal plate.

In the above-described embodiments, it is exemplified that the gap flow-path G between the cool-air end part 52A and the cool-air seal 126 is a convergent flow path, but the door structure of the air mixing door 50 is not limited thereto.

In the door structure of the air mixing door 50, for example, a distance between the warm-air end part 52B and the warm-air seal 128 may decrease downstream in air flow such that a gap flow-path between the warm-air end part 52B and the warm-air seal 128 becomes a convergent flow path. According to this, since an unsteady fluid force acts on the warm-air end part 52B of the air mixing door 50 in a direction of attenuating vibration, the self-excited vibration of the air mixing door 50 can be suppressed.

In the door structure of the air mixing door 50, the gap flow-path G formed between the cool-air end part 52A and the cool-air seal 126 and the gap flow-path formed between the warm-air end part 52B and the warm-air seal 128 may be both a convergent flow path. According to this, since unsteady fluid forces act on both the cool-air end part 52A and the warm-air end part 52B of the air mixing door 50 in the direction of attenuating vibration, the self-excited vibration of the air mixing door 50 can be suppressed.

In each of the embodiments described above, examples are described in which the passage opening and closing device of the present disclosure is applied to the interior air-conditioning unit 10 of the vehicle air conditioner, but these examples are not limited thereto. The passage opening and closing device of the present disclosure can be applied to, for example, an inside/outside air switching box having an inside/outside air switching door, or a door structure of a mode switching door such as the defroster door 25, the face door 27, and the foot door 29. Further, the passage opening and closing device of the present disclosure can be applied not only to a vehicle air conditioner but also to various devices for opening and closing an air passage.

In the above embodiments, it goes without saying that the components constituting the embodiments are not necessarily indispensable unless otherwise clearly stated or unless otherwise thought to be clearly indispensable in principle.

In the above embodiments, when a numerical value such as the number, a numerical value, an amount, or a range of the component of the embodiment is mentioned, the numerical value is not limited to the specified number unless otherwise specified to be indispensable or clearly limited to the specified number in principle.

In the above embodiments, when a shape, a positional relationship, or the like of the component or the like is mentioned, the shape, the positional relationship, or the like is not limited to that being mentioned unless otherwise specified or limited to a specified shape, a specified positional relationship, or the like in principle.

According to a first aspect shown in a part or whole of the above embodiments, the passage opening and closing device includes a casing and a sliding door that opens and closes an opening of the casing. The sliding door includes a door end part that forms an end part of the sliding door facing in a door moving direction of the sliding door. The door end part faces an opening edge when the sliding door is positioned at a closed position where the sliding door closes the opening. The opening edge includes a door facing wall that faces the door end part when the sliding door is located at the closed position. The door facing wall defines a gap flow-path extending in the door moving direction between the door facing wall and the door end part. A distance between the door end part and the door facing wall decreases downstream in air flow so that the gap flow-path is a convergent flow path.

According to a second aspect, the door facing wall includes an inclined portion that is inclined with respect to the door moving direction so that a distance between the inclined portion and the door end part increases with distance from the opening. Since the inclined portion is provided in the door facing wall, a convergent flow path can be formed between the door facing wall and the door end part.

According to a third aspect, the door facing wall includes a flat portion between the opening and the inclined portion. The flat portion is smaller in inclination angle with respect to the door moving direction than the inclined portion. Since the flat portion having a smaller inclination angle than that of the inclined portion is provided in the door facing wall, when the sliding door is placed at the closed position, a contact area (i.e. sealing area) between the door end part of the sliding door and the door facing wall can be secured easily. This greatly contributes to improvement of a sealing property of the sliding door.

According to a fourth aspect, the door end part is inclined with respect to the door moving direction so that a distance between the door end part and the door facing wall increases with distance from the opening when the sliding door is placed at the closed position. Therefore, such inclination of the door end part of the sliding door can form a convergent flow path between the door facing wall and the door end part.

According to a fifth aspect, the sliding door has a door intermediate part that covers the opening when the sliding door is placed at the closed position. The door intermediate part has at least a part lower in rigidity than the door end part.

Since the rigidity of the door intermediate part of the sliding door is reduced, the door intermediate part is easily deformed to become convex leeward by wind pressure acting on the air mixing door when the air mixing door is placed at the closed position where the cool air opening is closed. When the door intermediate part of the sliding door becomes convex leeward, the door end part is inclined such that a distance between the door end part and the door facing wall increases with distance from the opening. Therefore, even when the rigidity of the door intermediate part of the sliding door is small, a convergent flow path can be formed between the door facing wall and the door end part.

According to a sixth aspect, the passage opening and closing device includes a guide rail that guides movement of the sliding door. The guide rail extends along the door moving direction. According to this, a convergent flow path can be formed between the door facing wall and the door end part while the sliding door is movable along the guide rail in the door moving direction.

What is claimed is:

1. A passage opening and closing device that opens and closes an air passage through which air passes, the passage opening and closing device comprising:
    a casing in which an opening edge defining an opening of the air passage is provided; and
    a sliding door slidably movable inside the casing to open and close the opening, wherein
    the sliding door includes a door end part that forms an end part of the sliding door in a door moving direction of the sliding door,
    the door end part faces the opening edge when the sliding door is placed at a closed position where the sliding door closes the opening,
    the opening edge includes a door facing wall that faces the door end part when the sliding door is placed at the closed position,
    the door facing wall defines a gap flow-path extending in the door moving direction between the door facing wall and the door end part,
    a distance between the door end part and the door facing wall when the sliding door is placed at the closed position continuously decreases downstream in air flow so that the gap flow-path is a convergent flow path, and
    change in the distance between the door end part and the door facing wall when the sliding door is placed at the closed position discontinuously shifts from decrease to increase at a downstream end of the convergent flow path.

2. The passage opening and closing device according to claim 1, wherein
    the door facing wall includes an inclined portion that is inclined with respect to the door moving direction so that a distance between the inclined portion and the door end part increases with distance from the opening.

3. The passage opening and closing device according to claim 2, wherein
    the door facing wall includes a flat portion between the opening and the inclined portion, and
    the flat portion is smaller in inclination angle with respect to the door moving direction than the inclined portion.

4. The passage opening and closing device according to claim 1, wherein
the door end part is inclined with respect to the door moving direction so that a distance between the door end part and the door facing wall increases with distance from the opening when the sliding door is placed at the closed position.

5. The passage opening and closing device according to claim 1, wherein
the sliding door has a door intermediate part that covers the opening when the sliding door is placed at the closed position, and
the door intermediate part has at least a part lower in rigidity than the door end part.

6. The passage opening and closing device according to claim 1, comprising
a guide rail that guides movement of the sliding door, wherein
the guide rail extends along the door moving direction.

7. A passage opening and closing device that opens and closes an air passage through which air passes, the passage opening and closing device comprising:
a casing in which an opening edge defining an opening of the air passage is provided; and
a sliding door slidably movable inside the casing to open and close the opening, wherein
the sliding door includes a door end part that forms an end part of the sliding door in a door moving direction of the sliding door,
the door end part faces the opening edge when the sliding door is placed at a closed position where the sliding door closes the opening,
the opening edge includes a door facing wall that faces the door end part when the sliding door is placed at the closed position,
the door facing wall defines a gap flow-path extending in the door moving direction between the door facing wall and the door end part,
a distance between the door end part and the door facing wall when the sliding door is placed at the closed position decreases downstream in air flow so that the gap flow-path is a convergent flow path,
the door end part includes a flat portion extending in the door moving direction, and
the door facing wall includes an inclined portion that is inclined with respect to the flat portion so that a distance between the inclined portion and the flat portion increases with distance from the opening.

8. A passage opening and closing device that opens and closes an air passage through which air passes, the passage opening and closing device comprising:
a casing in which an opening edge defining an opening of the air passage is provided; and
a sliding door slidably movable inside the casing to open and close the opening, wherein
the sliding door includes a door end part that forms an end part of the sliding door in a door moving direction of the sliding door,
the door end part faces the opening edge when the sliding door is placed at a closed position where the sliding door closes the opening,
the opening edge includes a door facing wall that faces the door end part when the sliding door is placed at the closed position,
the door facing wall defines a gap flow-path extending in the door moving direction between the door facing wall and the door end part,
a distance between the door end part and the door facing wall when the sliding door is placed at the closed position decreases downstream in air flow so that the gap flow-path is a convergent flow path, and
the gap flow-path is a path through which an area upstream of the sliding door and an area downstream of the sliding door communicate with each other so that air flows through the gap flow-path when the sliding door is placed at the closed position.

\* \* \* \* \*